(12) United States Patent
Ekuni et al.

(10) Patent No.: US 8,897,939 B2
(45) Date of Patent: Nov. 25, 2014

(54) AUTOMATIC STEERING DEVICE AND AUTOMATIC STEERING METHOD

(71) Applicant: FURUNO Electric Company Limited, Nishinomiya, Hyogo (JP)

(72) Inventors: Suminori Ekuni, Nishinomiya (JP); Kazutoshi Shimo, Nishinomiya (JP); Kentaroh Hamamoto, Nishinomiya (JP)

(73) Assignee: FURUNO Electric Company Limited, Hyogo (JP)

( * ) Notice: Subject to any disclaimer, the term of this patent is extended or adjusted under 35 U.S.C. 154(b) by 14 days.

(21) Appl. No.: 13/860,071

(22) Filed: Apr. 10, 2013

(65) Prior Publication Data

US 2013/0276688 A1 Oct. 24, 2013

(30) Foreign Application Priority Data

Apr. 20, 2012 (JP) ................................. 2012-097135

(51) Int. Cl.
*B63H 25/04* (2006.01)
*G05D 1/02* (2006.01)

(52) U.S. Cl.
CPC .............. *B63H 25/04* (2013.01); *G05D 1/0206* (2013.01); *Y02T 70/747* (2013.01)
USPC .......................................................... 701/21

(58) Field of Classification Search
USPC .......................................................... 701/21
See application file for complete search history.

(56) References Cited

U.S. PATENT DOCUMENTS

| | | | | |
|---|---|---|---|---|
| 5,313,397 A | * | 5/1994 | Singh et al. | 701/21 |
| 6,931,313 B2 | * | 8/2005 | Kato et al. | 701/41 |
| 7,832,522 B2 | * | 11/2010 | Akuta et al. | 180/400 |
| 2005/0071061 A1 | * | 3/2005 | Kato et al. | 701/41 |
| 2011/0294370 A1 | * | 12/2011 | Kuriyagawa et al. | 440/1 |
| 2012/0021659 A1 | * | 1/2012 | Ota | 440/41 |
| 2012/0143408 A1 | * | 6/2012 | Hosokawa | 701/21 |

FOREIGN PATENT DOCUMENTS

| | | |
|---|---|---|
| JP | 59-081274 A | 5/1984 |
| JP | 1-289797 A | 11/1989 |
| JP | 2003-111802 A | 4/2003 |
| JP | 2004-217180 A | 8/2004 |

* cited by examiner

*Primary Examiner* — Thomas Tarcza
*Assistant Examiner* — Alex C Dunn
(74) *Attorney, Agent, or Firm* — Global IP Counselors, LLP

(57) ABSTRACT

There is provided an automatic steering device with which an optimal duty ratio for achieving an optimal rudder turning speed at a cruising speed can be found simply and accurately. An automatic steering device 10 includes a correspondence acquisition component 24 and a duty ratio calculator 25. The correspondence acquisition component 24 finds a correspondence between a duty ratio and a rudder turning speed based on a first rudder turning speed while a steering mechanism 11 is controlled at a first duty ratio, and a second rudder turning speed while the steering mechanism 11 is controlled at a second duty ratio. The duty ratio calculator 25 calculates the duty ratio corresponding to a specific rudder turning speed based on the correspondence found by the correspondence acquisition component 24.

18 Claims, 6 Drawing Sheets

| Rudder turning speed (deg/sec) | | Hull length L (ft) (for power boat) | | | | |
|---|---|---|---|---|---|---|
| | | 20 ≤ L < 30 | 30 ≤ L < 40 | 40 ≤ L < 50 | 50 ≤ L < 60 | 60 ≤ L |
| Cruising speed V (kt) | 10 ≤ V < 20 | 2 ~ 9 | 2 ~ 9 | 3 ~ 10 | 4 ~ 12 | ≥ 9 |
| | 20 ≤ V < 30 | 2 ~ 9 | 2 ~ 9 | 3 ~ 9 | 4 ~ 9 | 5 ~ 11 |
| | 30 ≤ V ≤ 40 | 2 ~ 9 | 2 ~ 9 | 2 ~ 9 | 2 ~ 10 | 2 ~ 11 |

FIG. 2

AUTOMATIC STEERING DEVICE AND AUTOMATIC STEERING METHOD

CROSS-REFERENCE TO RELATED APPLICATIONS

This application claims priority to Japanese Patent Application No. 2012-097135 filed on Apr. 20, 2012. The entire disclosure of Japanese Patent Application No. 2012-097135 is hereby incorporated herein by reference.

BACKGROUND

1. Field of the Invention

The present invention generally relates to an operation test for determining the duty ratio of drive voltage applied to a steering mechanism in an automatic steering device.

2. Background Information

A ship that is underway is subjected to the effects of waves, wind, and other such external disturbances, which cause the orientation of the ship to fluctuate constantly. Therefore, small steering inputs have to be made continuously in order to maintain a steady course (the direction in which the prow is facing), and this imposes a burden on the helmsman. There are known automatic steering devices that provide feedback control of the steering mechanism so as to maintain a preset course automatically. An automatic steering device such as this is discussed in Japanese Laid-Open Patent Application Publication No. H1-289797 (Patent Literature 1), for example.

The amount by which a steering mechanism changes the rudder angle (the angle of the rudder) per unit of time is called the rudder turning speed. If the rudder turning speed is too slow, the vessel is less maneuverable, but if the rudder turning speed is too fast, the vessel becomes unstable. In view of this, an automatic steering device preferably controls the steering mechanism so as to move the rudder at the optimal rudder turning speed.

The optimal rudder turning speed varies with the vessel speed and hull length. FIG. 2 is a graph of how hull length and cruising speed are related to the range of the optimal rudder turning speed. The term cruising speed refers to the speed at which the vessel moves in a state of the best fuel economy, and is the usual movement speed of a vessel. The hull length and cruising speed are determined for each vessel, so the optimal rudder turning speed is predetermined for each vessel. Therefore, an automatic steering device should control the steering mechanism so as to achieve the predetermined optimal rudder turning speed.

Patent Literature 1, Japanese Laid-Open Patent Application Publication No. 2004-217180 (Patent Literature 2), and Japanese Laid-Open Patent Application Publication No. S59-81274 (Patent Literature 3) disclose constitutions in which the rudder turning speed is varied according to vessel speed (or vehicle speed). Thus, the rudder turning speed may be varied according to the situation. In any case, it is desirable for an automatic steering device to control a steering mechanism properly so as to achieve a desired rudder turning speed.

The drive mechanism (a hydraulic pump, a motor, etc.) of a steering mechanism is usually controlled by PWM (pulse width modulation) method. In this case, the automatic steering device can control the rudder turning speed with the steering mechanism by setting the duty ratio of the drive voltage outputted to the steering mechanism. Since individual steering mechanisms vary from one to another, the duty ratio that is required to achieve the optimal rudder turning speed will vary from one steering mechanism to the next. In view of this, in the past, when an automatic steering device is initially installed in a vessel, an operation test (called a "rudder test") is performed to measure the rudder turning speed by driving the steering mechanism at a specific duty ratio.

A conventional operation test method will be described through reference to the flowchart in FIG. 6. In this operation test, the steering mechanism is driven while lowering the duty ratio in steps, and the rudder turning speed during this time is measured, in order to find the duty ratio at which the optimal rudder turning speed can be attained.

When an automatic steering device is initially installed in a vessel, the user starts the operation test by first subjecting this automatic steering device to suitable operations. Once the operation test is started by the user, the automatic steering device sets the duty ratio of the drive voltage outputted to the steering mechanism to the maximum value (100%) (step S201). The automatic steering device then applies the drive voltage of the set duty ratio to the steering mechanism, thereby driving the steering mechanism (step S202). This moves the rudder and changes the rudder angle. The automatic steering device measures the rudder turning speed by using a suitable sensor or the like to detect this movement of the rudder (step S203).

Then, the automatic steering device determines whether or not the measured rudder turning speed falls within the optimal range for rudder turning speed illustrated in FIG. 2 (step S204). If the rudder turning speed does fall within the optimal range for rudder turning speed, the automatic steering device stores the duty ratio used for measuring this rudder turning speed as the optimal duty ratio (step S205), and displays the resulting optimal duty ratio on a suitable display means (step S206).

If the measured rudder turning speed does not fall within the optimal range in the determination in step S204, the automatic steering device reduces the duty ratio in steps and repeats the above-mentioned measurement of rudder turning speed. For example, in the flowchart in FIG. 6, the duty ratio is lowered by 10% each time (step S208), and measurement of the rudder turning speed is repeated until the rudder turning speed falls within the optimal range.

Because a certain amount of force is necessary to move a rudder, the rudder may not move if the duty ratio is too low. Therefore, there is no point in performing the above operation test at a duty ratio setting that is too low. In view of this, in the flowchart in FIG. 6 the test is stopped when the duty ratio drops below 50% (step S207).

The above operation test can find the optimal duty ratio for achieving the optimal rudder turning speed at cruising speed. In automatic steering control by an automatic steering device, the steering mechanism is driven by applying drive voltage of the optimal duty ratio found in the above operation test to the steering mechanism. This allows the automatic steering device to perform automatic steering control at the optimal rudder turning speed at cruising speed.

SUMMARY

However, because the operation test method illustrated by the flowchart in FIG. 6 involves repeating measurement of the rudder turning speed while the duty ratio is lowered by 10% each time, the optimal duty ratio cannot be found at a precision that is finer than 10%. Therefore, the operation test method depicted in FIG. 6 cannot necessarily be called a precise test method.

Of course, if the amount by which the duty ratio is lowered in step S208 in FIG. 6 were reduced to less than 10%, it would be possible to find the optimal duty ratio at a precision finer than 10%. However, if the amount in which the duty ratio is lowered is reduced, that means that the processing of steps S202 and S203 have to be repeated more times until the rudder turning speed falls within the optimal range. Therefore, a problem is that it takes longer to finish the operation test.

Also, depending on the type of vessel, the steering mechanism may not be equipped with a sensor for detecting the position of the rudder (rudder angle sensor). If the steering mechanism has not rudder angle sensor, then the automatic steering device cannot detect movement of the rudder, so the rudder turning speed cannot be measured by this automatic steering device. Therefore, the operation test in FIG. 6 cannot be performed automatically with a vessel such as this.

Even if the steering mechanism is not equipped with a rudder angle sensor, it is still possible for the operation test in FIG. 6 to be performed. In this case, however, it will be necessary to measure the rudder turning speed by having a worker visually check the movement of the rudder. Since visual measurement of the rudder turning speed by a worker is extremely time-consuming, it is preferable for the measurement of rudder turning speed in the operation test (step S203 in FIG. 6) to be performed as few times as possible.

For example, Japanese Laid-Open Patent Application Publication No. 2003-111802 (Patent Literature 4) discloses a constitution in which the approximate load torque is found based on the drive current of the motor. Thus, there is proposed a way to detect various situations by detecting the drive current of a motor, without having to use any special sensor. Therefore, if the position of the rudder can be detected based on the drive current of a steering mechanism, then the rudder turning speed can be measured even though the steering mechanism is not equipped with a rudder angle sensor.

The present invention was conceived in light of the above situation, and its principal object is to provide an automatic steering device with which the optimal duty ratio for achieving the optimal rudder turning speed at cruising speed can be found simply and accurately. Another object of the present invention is to provide an automatic steering device with which the above-mentioned optimal duty ratio can be found even when the steering mechanism is not equipped with a rudder angle sensor.

The problem to be solved by the present invention is as given above, and the means for solving this problem, and the effect thereof, will now be described.

With a first aspect of the present invention, there is provided an automatic steering device with the following configuration, with which a steering mechanism for driving a rudder of a moving body is controlled based on a parameter corresponding to a rudder turning speed. Specifically, this automatic steering device comprises a correspondence acquisition component and a parameter calculator. The correspondence acquisition component finds the correspondence between the rudder turning speed and a value of the parameter based on the rudder turning speed while the steering mechanism is controlled by setting the parameter to a first value and the rudder turning speed while the steering mechanism is controlled by setting the parameter to a second value. The parameter calculator calculates the parameter corresponding to a specific rudder turning speed based on the correspondence found by the correspondence acquisition component.

Thus, the rudder turning speed is measured twice, and the correspondence between the parameter (such as a duty ratio) and the rudder turning speed is found based on the result obtained in these two measurements. Since the rudder turning speed only needs to be measured twice, there is no need for the rudder turning speed to be measured over and over. As discussed above, the parameter (such as the duty ratio) that is necessary for achieving the desired rudder turning speed can be calculated accurately at any time by finding the correspondence between the parameter (such as the duty ratio) and the rudder turning speed in advance.

The above-mentioned automatic steering device can be configured so as to comprise a drive current acquisition component that detects a drive current of the steering mechanism, and a position detector that detects a position of the rudder based on the drive current.

With this configuration, the position of the rudder can be detected by monitoring the drive current of the steering mechanism, even though no special sensor is provided for detecting the position of the rudder.

The above-mentioned automatic steering device can also have a configuration as follows. Specifically, one in which the position detector detects that the rudder has reached an end of its movable range upon detecting a sudden increase in the drive current.

Specifically, when the rudder reaches the limit of its physically movable range, the load increases at the steering mechanism, and there is a sudden increase in drive current. Therefore, as discussed above, it can be detected that the rudder has reached the end of its physically movable range based on detecting a sudden increase in drive current.

With the above-mentioned automatic steering device, it is preferable if the position detector detects the position of the rudder based on the drive current after a starting current stabilizes.

Specifically, since the drive current is higher (starting current) immediately after drive of the steering mechanism is started, this can be a cause of erroneous detection that the rudder has reached the end of its movable range. As discussed above, erroneous detection of the position of the rudder can be prevented by detecting the position of the rudder based on the drive current after the starting current stabilizes.

It is preferable if the above-mentioned automatic steering device comprises a rudder turning speed acquisition component that calculates the rudder turning speed by measuring how long it takes for the rudder to move from one end of its movable range to the other end.

As discussed above, that the rudder has moved to the end of its movable range can be detected based on the drive current of the steering mechanism, so the time it takes for the rudder to move from end to end of its movable range can be measured simply. Consequently, the rudder turning speed can be calculated without the use of a dedicated sensor for detecting the position of the rudder.

The above-mentioned automatic steering device is preferably configured as follows. Specifically, the parameter represents a duty ratio of drive voltage applied to the steering mechanism. The correspondence acquisition component finds the correspondence by considering that the duty ratio and the rudder turning speed are in a proportional relation.

Specifically, when the steering mechanism is controlled by PWM, the duty ratio and the rudder turning speed can be considered to be in a proportional relation. Therefore, the correspondence between the duty ratio and the rudder turning speed can be found simply.

The above-mentioned automatic steering device is preferably configured as follows. Specifically, this automatic steering device comprises an optimal rudder turning speed memory that stores an optimal rudder turning speed at a cruising speed of the moving body. The parameter calculator calculates the parameter corresponding to the optimal rudder turning speed at the cruising speed based on the correspondence found by the correspondence acquisition component.

The optimal rudder turning speed at cruising speed can be attained by utilizing the parameter (such as the duty ratio) thus found to control the steering mechanism.

The above-mentioned automatic steering device is preferably configured as follows. Specifically, this automatic steering device comprises a running situation acquisition component that acquires a running situation of the moving body, and a rudder turning speed adjuster that acquires an optimal rudder turning speed according to the running situation. The parameter calculator calculates the parameter corresponding to the optimal rudder turning speed acquired by the rudder turning speed adjuster based on the correspondence found by the correspondence acquisition component.

The optimal rudder turning speed according to the running situation can be attained by utilizing the parameter (such as the duty ratio) thus found to control the steering mechanism.

With another aspect of the present invention, there is provided an automatic steering method for controlling a steering mechanism for driving a rudder of a moving body, based on a parameter corresponding to a rudder turning speed. This automatic steering method includes a first rudder turning speed acquisition step, a second rudder turning speed acquisition step, a correspondence acquisition step, and a parameter calculation step. The first rudder turning speed acquisition step entails acquiring the rudder turning speed while the steering mechanism is controlled by setting the parameter to a first value. The second rudder turning speed acquisition step entails acquiring a rudder turning speed while the steering mechanism is controlled by setting the parameter to a second value. The correspondence acquisition step entails finding a correspondence between the rudder turning speed and a value of the parameter based on the rudder turning speed acquired in the first rudder turning speed acquisition step and the rudder turning speed acquired in the second rudder turning speed acquisition step. The parameter calculation step entails calculating the parameter corresponding to a specific rudder turning speed based on the correspondence found in the correspondence acquisition step.

The above-mentioned automatic steering method can include a current detection step of detecting a drive current of the steering mechanism, and a position detection step of detecting a position of the rudder based on the drive current.

BRIEF DESCRIPTION OF THE DRAWINGS

Referring now to the attached drawings which form a part of this original disclosure:

FIG. 2 is a table of the relation of the optimal rudder turning speed to cruising speed and hull length;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
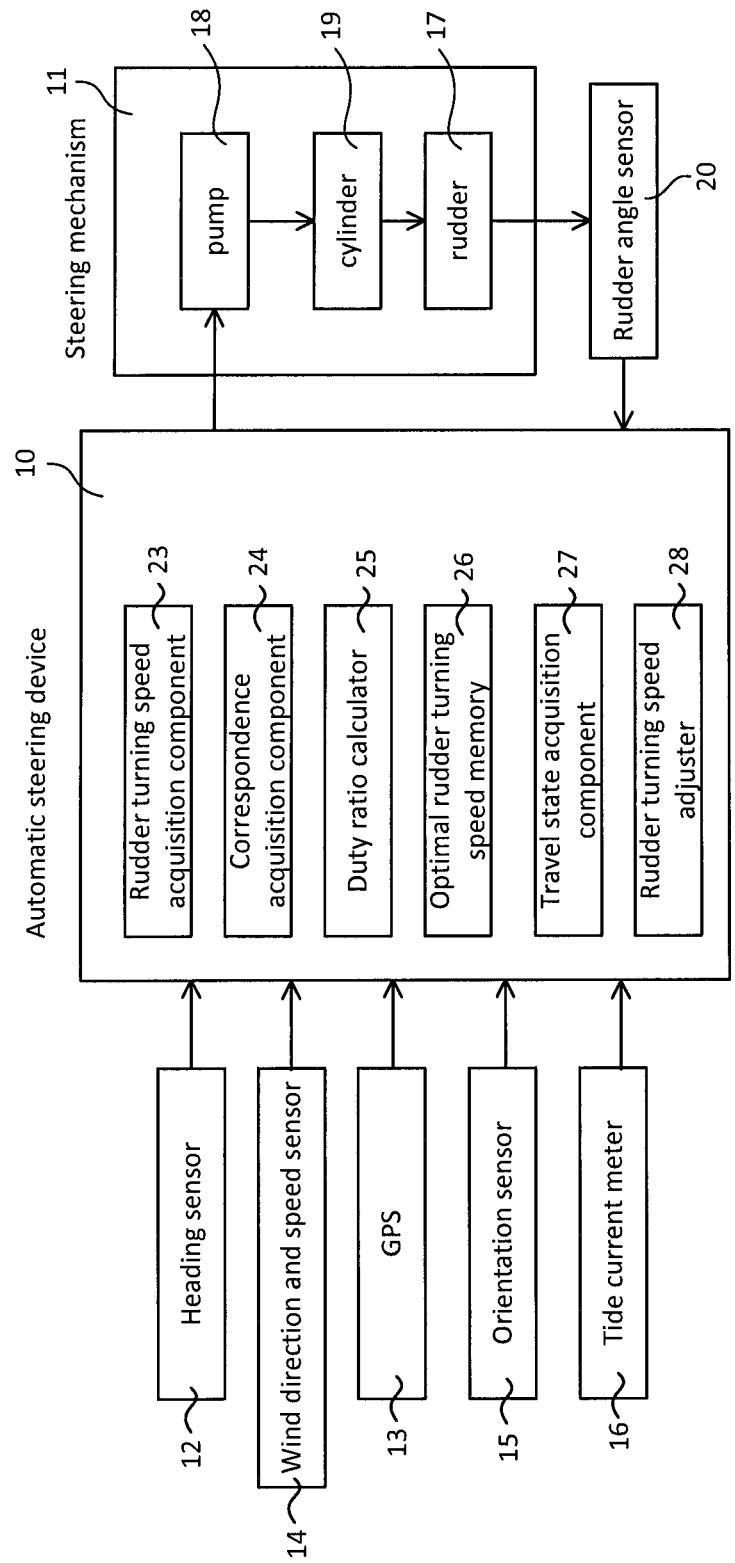
FIG. 1 is a block diagram of the functions of the automatic steering device pertaining to an embodiment of the present invention.

An embodiment of the present invention will be described through reference to the drawings. FIG. 1 is a block diagram of the functions of the configuration of an automatic steering system equipped with the automatic steering device 10 pertaining to the present invention.

This automatic steering device 10 is attached to the hull of a boat or ship that is being controlled. In addition to the automatic steering device 10, this vessel also includes a steering mechanism 11 and various kinds of running situation detector for acquiring the running situation of the vessel (such as a heading sensor 12, a GPS receiver 13, a wind direction and speed sensor 14, an orientation sensor 15, and a tide current meter 16).

The steering mechanism 11 is used to change the angle of a rudder 17 (rudder angle). In this embodiment, the steering mechanism 11 includes a hydraulic pump 18 configured as a reversible pump, and a hydraulic cylinder 19 that is driven by hydraulic fluid discharged by the hydraulic pump 18, and is configured so that the rudder 17 is driven by the hydraulic cylinder 19. Drive voltage for driving the hydraulic pump 18 is applied to the hydraulic pump 18. In the following description, the drive voltage of the hydraulic pump 18 of the steering mechanism 11 will be referred to simply as the "drive voltage of the steering mechanism 11."

When drive voltage is applied to the steering mechanism 11, the steering mechanism 11 is driven and the rudder angle is changed. The automatic steering device 10 is configured so that the rudder angle can be changed by driving the steering mechanism 11 as needed by switching the drive voltage outputted to the steering mechanism 11 on or off.

Also, the automatic steering device 10 is configured so that the rudder turning speed produced by the steering mechanism 11 can be controlled by setting a specific parameter (more precisely, the duty ratio). More specifically, the hydraulic pump 18 of the steering mechanism 11 is controlled by PWM method. Also, the automatic steering device 10 is configured so that the duty ratio of the drive voltage outputted to the (hydraulic pump 18 of the) steering mechanism 11 can be suitably varied. Rate at which hydraulic fluid is discharged by the hydraulic pump 18 varies in proportion to the duty ratio of the drive voltage. Therefore, the rudder turning speed produced by the steering mechanism 11 can be varied by varying the duty ratio of the drive voltage applied to the steering mechanism 11.

The heading sensor 12 is configured so as to detect the heading of the prow of the vessel. Also, the steering mechanism 11 includes a rudder angle sensor 20 that detects the actual angle of the rudder 17 (actual rudder angle). The actual rudder angle detected by the rudder angle sensor 20 and the heading detected by the heading sensor 12 are inputted to the automatic steering device 10.

The user operates a setting knob, for example, to input the course to be covered by the vessel (the set course) to the automatic steering device 10. The automatic steering device 10 controls the steering mechanism 11 to change the rudder angle and turn the vessel so that the heading will be on the set course that has been set by the user. A known feedback control method such as PID control can be used for this control. A configuration for the feedback control of the rudder angle in an automatic steering device is public knowledge, and will therefore not be described in detail herein.

The above-mentioned feedback control can be used to automatically correct the rudder angle and put the heading onto the set course even though the orientation of the vessel fluctuates due to the effects of waves, wind, and so forth. Therefore, maintaining the course is easy despite any external disturbances such as waves or wind, which means that much less of a burden is imposed on the helmsman.

The configuration of the automatic steering device 10 in this embodiment will now be described in detail.

The automatic steering device 10 includes a rudder turning speed acquisition component 23, a correspondence acquisition component 24, a duty ratio calculator (parameter calculator) 25, an optimal rudder turning speed memory 26, a running situation acquisition component 27, and a rudder turning speed adjuster 28.

The optimal rudder turning speed memory 26 stores a table such as that in FIG. 2, which gives the relation of the optimal range of rudder turning speed to cruising speed and hull length. The user of the automatic steering device 10 preset the hull length of the vessel and the cruising speed in the automatic steering device 10 by operations as needed. The automatic steering device 10 can find the optimal range of rudder turning speed at the cruising speed of the vessel based on the hull length and cruising speed set by the user and the contents stored in the optimal rudder turning speed memory 26.

The rudder turning speed acquisition component 23 is configured so as to acquire the actual rudder turning speed when the rudder angle has been changed by the steering mechanism 11. In this embodiment, since the steering mechanism 11 is equipped with the rudder angle sensor 20, the automatic steering device 10 can acquire the current rudder angle very simply. In view of this, the rudder turning speed acquisition component 23 founds the rudder turning speed by acquiring the amount of change in the rudder angle per unit of time based on the output of the rudder angle sensor 20. Of course, the method by which the rudder turning speed acquisition component 23 acquires the rudder turning speed is not limited to this, and any method can be used so long as it allows the rudder turning speed to be acquired. For example, an angular velocity sensor that detects the rate of change (the angular velocity) in the rudder angle can be provided in advance, and the rudder turning speed acquired by means of this angular velocity sensor.

Figure 3:
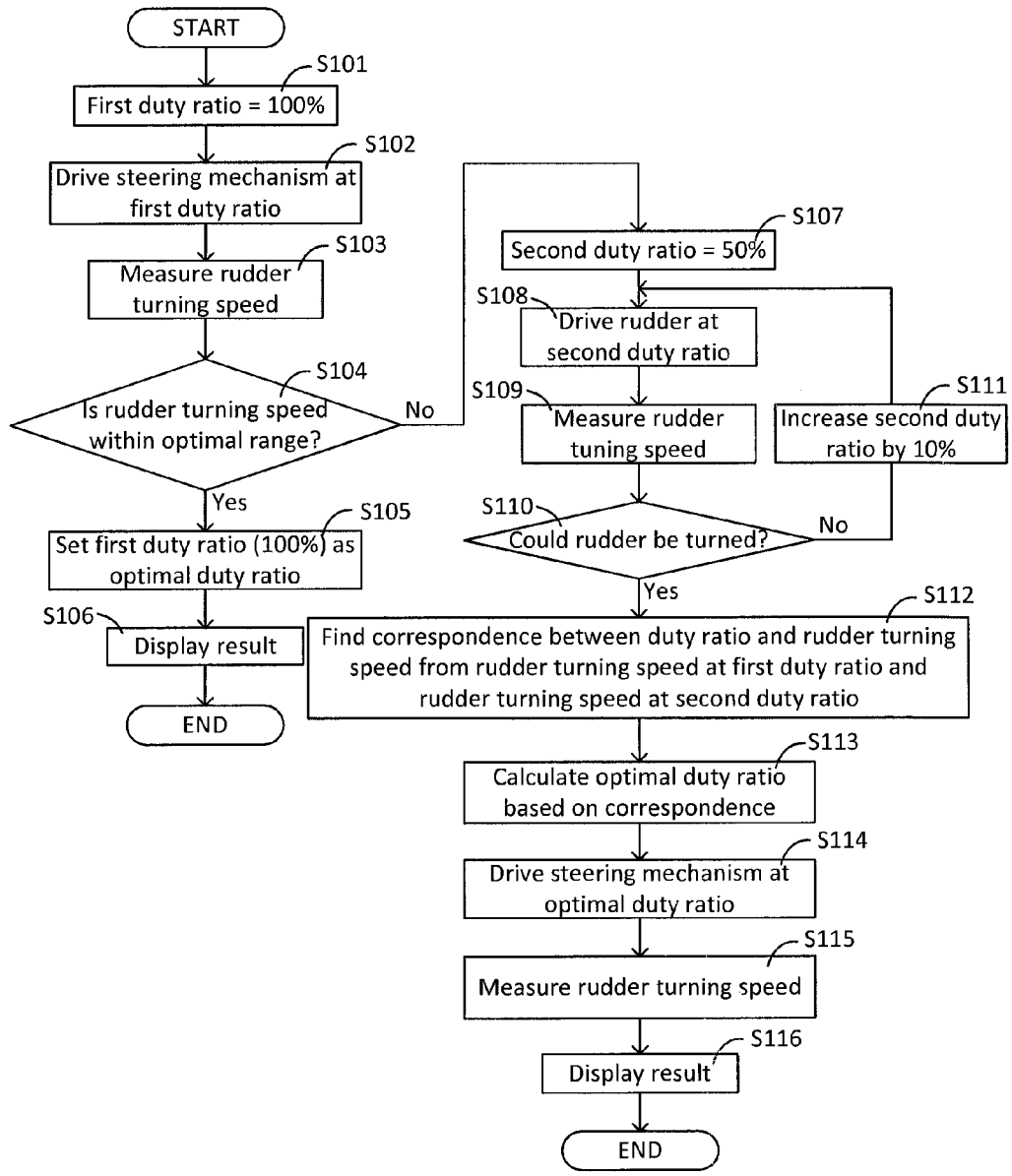
FIG. 3 is a flowchart of the method for conducting an operation test on the automatic steering device pertaining to an embodiment of the present invention.

The functions of the correspondence acquisition component 24 and the duty ratio calculator 25 will now be described through reference to FIG. 3. FIG. 3 is a flowchart of a rudder test (operation test) included in an automatic steering method featuring the automatic steering device 10 of this embodiment.

As discussed above, an operation test of the automatic steering device 10 is conducted when this automatic steering device 10 is first installed in the vessel. When the automatic steering device 10 is installed, the user first performs a specific operation on the automatic steering device 10 to start the operation test. Once the operation test starts, the automatic steering device 10 sets the duty ratio to a specific first value (first duty ratio $D_1$; 100% in this embodiment) (step S101), and drives the steering mechanism 11 (step S102). The rudder turning speed acquisition component 23 measures the rudder turning speed at this point (the first rudder turning speed $v_1$) (step S103; first rudder turning speed acquisition step).

The automatic steering device 10 then refers to the contents stored in the optimal rudder turning speed memory 26 (FIG. 2), and determines whether or not the first rudder turning speed $v_1$ acquired at the first duty ratio $D_1$ has fallen within the optimal rudder turning speed range at cruising speed (step S104).

If the first rudder turning speed $v_1$ has fallen within the optimal rudder turning speed range, the first duty ratio $D_1$ (100% in this embodiment) is the optimal duty ratio for controlling the steering mechanism 11 at cruising speed (optimal duty ratio). In this case, the automatic steering device 10 sets the first duty ratio $D_1$ (100% in this embodiment) as the optimal duty ratio, displays this result (step S106), and ends the operation test.

In step S104, if the first rudder turning speed $v_1$ has not fallen within the optimal rudder turning speed range at cruising speed, the automatic steering device 10 sets the duty ratio to a specific second value (second duty ratio $D_2$; 50% in this embodiment) (step S107), and drives the steering mechanism 11 (step S108). The rudder turning speed acquisition component 23 measures the rudder turning speed at this point (second rudder turning speed $v_2$) (step S109; second rudder turning speed acquisition step).

As discussed above, there are times when the rudder will not move if the duty ratio is too low. If the rudder does not move, the second rudder turning speed $v_2$ cannot be measured. In view of this, the automatic steering device 10 determines whether or not the rudder could be moved at the second duty ratio $D_2$ (step S110), and if the rudder could not be moved, the second duty ratio $D_2$ is increased by a specific amount (10% in this embodiment) (step S111), and the second rudder turning speed $v_2$ is measured again.

Once the first rudder turning speed $v_1$ and the second rudder turning speed $v_2$ are obtained, the correspondence acquisition component 24 finds the correspondence between the rudder turning speed and the duty ratio (step S112, correspondence acquisition step).

If the configuration is such that the steering mechanism 11 is controlled by PWM method, as in this embodiment, the duty ratio of the drive voltage applied to the steering mechanism 11 can be considered to be in a simple proportional relation to the rudder turning speed produced by the steering mechanism 11. Therefore, the correspondence between the duty ratio and the rudder turning speed can be found simply, as discussed below, based on the first rudder turning speed $v_1$ while the steering mechanism 11 is controlled at the first duty ratio $D_1$ and the second rudder turning speed $v_2$ while the steering mechanism 11 is controlled at the second duty ratio $D_2$. Here, $D(v)$ indicates the duty ratio required to drive the steering mechanism 11 at a rudder turning speed v.

$$D(v) = D_2 + \frac{D_1 - D_2}{v_1 - v_2}(v - v_2) \quad (1)$$

Next, the duty ratio calculator 25 refers to the contents stored in the optimal rudder turning speed memory 26 to acquire the optimal rudder turning speed at the cruising speed of the vessel. The "range" of the optimal rudder turning speed at cruising speed is stored in the optimal rudder turning speed memory 26 of this embodiment (FIG. 2). In view of this, the duty ratio calculator 25 employs the median value of this range, for example, as the optimal rudder turning speed at cruising speed. This is not the only option, of course, so long as the optimal rudder turning speed at cruising speed can be acquired based on the contents stored in the optimal rudder turning speed memory 26.

The duty ratio calculator 25 then calculates the duty ratio necessary to attain the optimal rudder turning speed at cruising speed (optimal duty ratio) based on the correspondence between rudder turning speed and duty ratio (step S113, parameter calculation step). More specifically, the optimal rudder turning speed at cruising speed is substituted for the variable v in Formula (1) above to calculate the duty ratio corresponding to this rudder turning speed (optimal duty ratio).

Finally, the automatic steering device 10 actually drives the steering mechanism 11 at the drive voltage of the optimal duty ratio found in step S113 (step S114), checks that a desired rudder turning speed has been obtained (step S115), and then suitably displays this result (step S116) and ends the operation test.

In automatic steering control by the automatic steering device 10 of this embodiment, the steering mechanism 11 is driven by applying the drive voltage of the optimal duty ratio found in the above operation test to the steering mechanism 11. This allows the automatic steering device 10 to perform automatic steering control at the optimal rudder turning speed at cruising speed.

As discussed above, with the operation test method using the automatic steering device 10 of this embodiment, the correspondence between duty ratio and rudder turning speed (Formula (1)) can be found by measuring the rudder turning speed twice (steps S103 and S109). The duty ratio corresponding to the optimal rudder turning speed at cruising speed (optimal duty ratio) can then be calculated based on the correspondence thus found.

Figure 6:
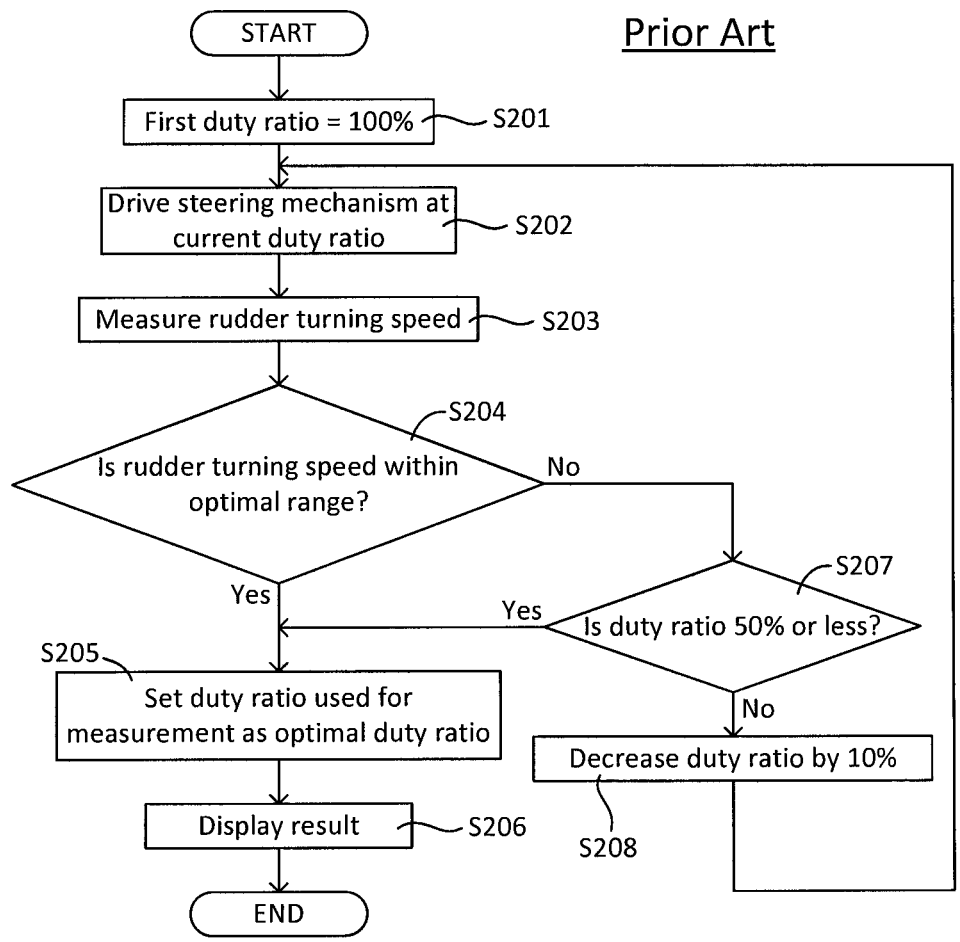
FIG. 6 is a flowchart of the method for conducting a conventional automatic steering test.

Thus, with the operation test method in this embodiment, the optimal duty ratio can be calculated merely by measuring the rudder turning speed twice, so the rudder turning speed does not have to be measured over and over as with a conventional operation test (FIG. 6).

Also, in the operation test method of this embodiment, the optimal duty ratio is calculated based on the correspondence between duty ratio and rudder turning speed (Formula (1)) after having found this correspondence, rather than directly determining the optimal duty ratio as with a conventional operation test (FIG. 6). The correspondence between duty ratio and rudder turning speed is a simple linear equation as in Formula (1), so the optimal duty ratio can be calculated at any precision based on Formula (1). This is a major difference from a conventional operation test method (FIG. 6) in which the optimal duty ratio could only be obtained at a precision in 10% increments.

Also, the automatic steering device 10 in this embodiment is configured so that the correspondence between duty ratio and rudder turning speed (Formula (1)) found as above is stored even after the above operation test has ended. Consequently, after the operation test has ended, the automatic steering device 10 can instantly and precisely calculate the duty ratio that is required to attain a certain rudder turning speed based on the stored correspondence (Formula (1)).

In view of this, the automatic steering device 10 in this embodiment is configured so that after the operation test has ended, the duty ratio is adjusted as needed according to the running situation while the vessel is underway normally.

Therefore, the running situation acquisition component 27 of the automatic steering device 10 is configured so as to detect the running situation of the vessel in real time based on the detection results of running situation detectors provided to the vessel (such as the heading sensor 12, the GPS receiver 13, the wind direction and speed sensor 14, the orientation sensor 15, and the tide current meter 16). The rudder turning speed adjuster 28 is configured so as to find the optimal rudder turning speed corresponding to the detected running situation.

This will be described more specifically. For example, the running situation acquisition component 27 is configured so as to acquire hull characteristics (maneuverability) of the vessel based on the change in the heading detected by the heading sensor 12 while the vessel is underway. If hull characteristics are acquired that exceed the maneuverability that was assumed when the operation test was conducted, the rudder turning speed adjuster 28 decreases the rudder turning speed accordingly. Conversely, if hull characteristics are acquired that are below the maneuverability that was assumed, the rudder turning speed is increased accordingly. This allows the rudder turning speed to be adjusted according to the actual hull characteristics of the vessel.

Also, the running situation acquisition component 27 is configured so as to acquire the current vessel speed based on information about the position of the vessel detected by the GPS receiver 13. If the current vessel speed is higher than the cruising speed, the rudder turning speed adjuster 28 decreases the rudder turning speed accordingly. Conversely, if the current vessel speed is lower than the cruising speed, the rudder turning speed is decreased accordingly. This allows the rudder turning speed to be adjusted according to the current vessel speed.

The running situation acquisition component 27 is also configured so as to determine the current sea condition based on the detected values from the wind direction and speed sensor 14, the orientation sensor 15, the tide current meter 16, etc. For example, if strong winds are detected by the wind direction and speed sensor 14, it can be concluded that the sea is rough. The same applies when the tide current meter 16 indicates a fast tidal flow. The sea can also be concluded to be rough when the orientation sensor 15 indicates that the orientation of the vessel (rolling, pitching) is fluctuating tempestuously. Rough seas call for a quick response, so the rudder turning speed adjuster 28 increases the rudder turning speed according to how rough the sea is. This allows the rudder turning speed to be adjusted according to the current sea condition.

When the rudder turning speed has been adjusted by the rudder turning speed adjuster 28, the duty ratio calculator 25 calculates the duty ratio required to attain the adjusted rudder turning speed based on Formula (1). The automatic steering device 10 is configured so as to drive the steering mechanism 11 based on the duty ratio adjusted as above. Since the automatic steering device 10 in this embodiment stores the correspondence between duty ratio and rudder turning speed (Formula (1)), the duty ratio required to attain the rudder turning speed corresponding to the running situation can always be calculated precisely. Automatic steering control can be performed at a rudder turning speed that corresponds to the actual running situation (such as the actual hull characteristics of the vessel, the current vessel speed, and the current sea condition) by driving the steering mechanism 11 based on the duty ratio adjusted according to the running situation.

As described above, the automatic steering device 10 in this embodiment controls the steering mechanism 11 based on the duty ratio, and is configured as follows. Specifically, this automatic steering device 10 includes the correspondence acquisition component 24 and the duty ratio calculator 25. The correspondence acquisition component 24 finds Formula (1), which indicates the correspondence between duty ratio and rudder turning speed, based on the first rudder turning speed $v_1$ while the steering mechanism 11 is controlled at the first duty ratio $D_1$, and the second rudder turning speed $v_2$ while the steering mechanism 11 is controlled at the second duty ratio $D_2$. The duty ratio calculator 25 calculates the duty ratio corresponding to a specific rudder turning speed based on the correspondence found by the correspondence acquisition component 24.

Thus, the rudder turning speed is measured twice, and the correspondence between duty ratio and rudder turning speed is found based on the result obtained by thus measuring twice. Since the rudder turning speed only needs to be measured twice, there is no need for the rudder turning speed to be measured over and over. As discussed above, the duty ratio required to attain the desired rudder turning speed can always be calculated precisely by finding the correspondence between duty ratio and rudder turning speed in advance.

Modification examples of the above embodiment will now be described.

In the above embodiment, the automatic steering device 10 is able to acquire the rudder turning speed by utilizing the detection value produced by the rudder angle sensor 20. Depending on the type and shape of the hull, however, it may be difficult or impossible to attach the rudder angle sensor 20 to the steering mechanism 11. If the steering mechanism 11 is not equipped with the rudder angle sensor 20, then the automatic steering device 10 will not be able to detect movement of the rudder 17, so the rudder turning speed cannot be measured.

In view of this, the automatic steering device 10 can be configured so that the user can visually measure the rudder turning speed, so as to deal with a situation such as this. For example, the rudder 17 is moved to face in a certain direction when the user performs a suitable operation so that the automatic steering device 10 drives the steering mechanism 11. Once the user visually confirms that the rudder 17 has moved by a specific angle, the user performs a suitable operation on the automatic steering device 10. The automatic steering device 10 calculates the rudder turning speed based on how long it took from when the rudder 17 started to move until the user visually confirmed that the rudder 17 had moved by a specific angle. Thus, even though no rudder angle sensor 20 is provided to the steering mechanism 11, the user can visually confirm the movement of the rudder 17 and thereby obtain the first rudder turning speed $v_1$ in step S103 in FIG. 3 and the second rudder turning speed $v_2$ in step S109. And since the first rudder turning speed $v_1$ and the second rudder turning speed $v_2$ can be acquired, the correspondence between duty ratio and rudder turning speed can be found, even though no rudder angle sensor 20 is provided to the steering mechanism 11.

Since it is a bother for the user to have to confirm the operation of the rudder 17 visually, measurement of the rudder turning speed by the above method places a burden on the user. By contrast, with the operation test method for the automatic steering device 10 in this embodiment, the correspondence between duty ratio and rudder turning speed can be found just by measuring the rudder turning speed two times at most. This means that the rudder turning speed does not have to be measured over and over, so the burden imposed on the user can be kept to a minimum.

Another embodiment of the present invention will now be described.

As described in the modification example above, depending on the type or shape of the hull, it may be difficult or impossible to attach the rudder angle sensor 20 to the steering mechanism 11. In the modification example given above, a configuration is described in which the user visually confirmed the movement of the rudder 17, but this imposes a burden on the user. In view of this, in the embodiment described below, the rudder turning speed can be calculated by detecting the position of the rudder 17 with the automatic steering device even though no rudder angle sensor is provided to the steering mechanism 11.

Figure 4:
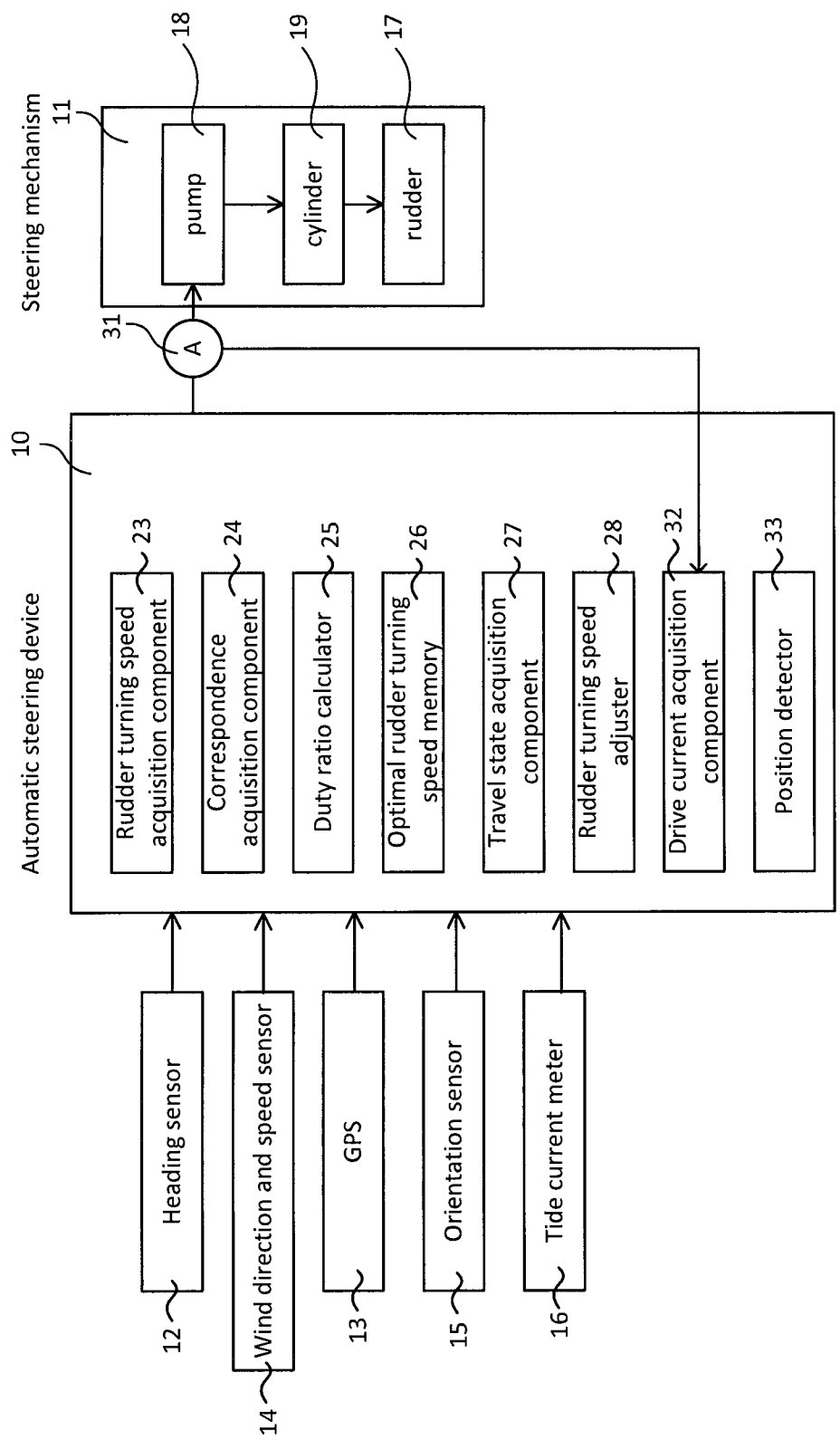
FIG. 4 is a block diagram of the functions of the automatic steering device pertaining to another embodiment of the present invention.

FIG. 4 is a block diagram of this embodiment. As shown in FIG. 4, in this embodiment a current sensor 31 that detects the amount of current (drive current) flowing to the hydraulic pump 18 of the steering mechanism 11 is provided near the steering mechanism 11. The amount of drive current detected by the current sensor 31 is acquired by a drive current acquisition component 32 of the automatic steering device 10.

The change over time in the drive current acquired by the drive current acquisition component 32 will be described using the graph in FIG. 5 as an example. The vertical axis in FIG. 5 is the amount of drive current, and the horizontal axis is the elapsed time.

Figure 5:
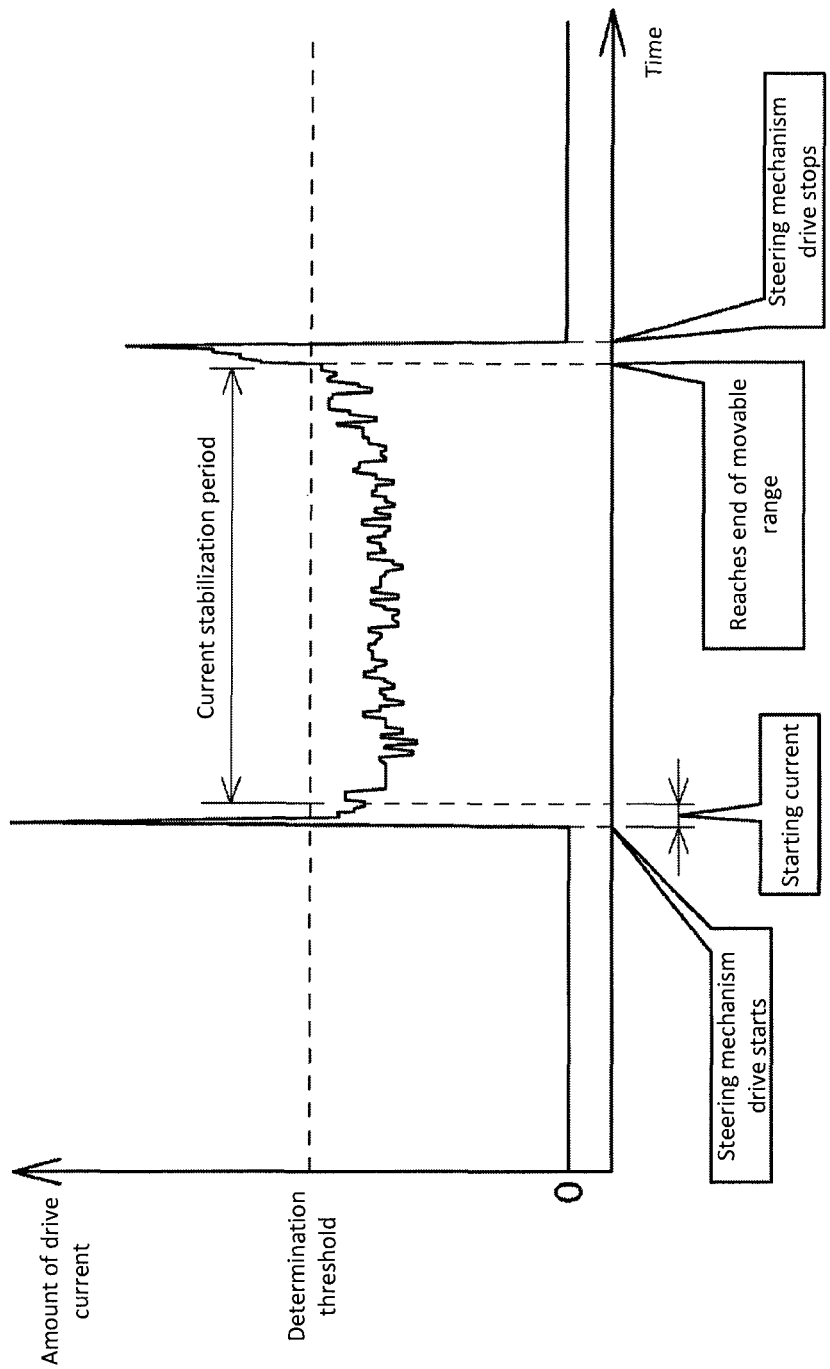
FIG. 5 is a graph giving an example of the change in drive current over time.

As shown in FIG. 5, when the steering mechanism 11 is not being driven, no drive voltage is applied to the steering mechanism 11, so the amount of drive current is zero. When drive voltage is applied to the steering mechanism 11 in this state and the drive of the steering mechanism 11 is commenced, a large force is temporarily required to start the stationary rudder 17 moving. Therefore, immediately after the drive of the steering mechanism 11 is started, the drive current is temporarily larger as shown in FIG. 5. The current that thus temporarily flows in a large quantity immediately after the start of drive of the steering mechanism 11 is called starting current.

Since the starting current falls off once the rudder 17 starts moving, the drive current stabilizes at a substantially constant value once a specific length of time has elapsed after the start of drive of the steering mechanism 11. If the steering mechanism 11 continues to be driven in this state, the rudder 17 eventually reaches the end of the range over which it is physically able to move (the movable range). When the rudder 17 has reached the end of its movable range, further application of drive voltage to the steering mechanism 11 will not move the rudder 17. As a result, the load on the steering mechanism 11 rises suddenly, so there is a spike in the drive current as shown in FIG. 5.

Based on the above, a position detector 33 of an automatic steering device 30 in this embodiment is configured so as to detect that the rudder 17 has reached the end of its movable range based on a sudden increase in the drive voltage.

This will now be described in more specific terms. The position detector 33 monitors the amount of drive current acquired by the drive current acquisition component 32. The position detector 33 is configured so as to calculate the average value for subsequent drive current after the drive of the steering mechanism 11 has started and it is detected that the starting current has stabilized. The settling down of the starting current can be detected by any suitably method. For instance, the position detector 33 in this embodiment is configured to determine that the starting current has stabilized once a specific length of time has elapsed since the drive of the steering mechanism 11 started. This is not the only option, of course, and the configuration can be such that the starting current is determined to have stabilized once the change in drive current becomes small after the start of the drive of the steering mechanism 11. The position detector 33 does not need to detect the exact timing at which the starting current stabilized. What is important is that the average value can be calculated for the drive current after the starting current has stabilized.

The position detector 33 recalculates the average value of the drive current, including the latest value for drive current, every time the latest drive current value is acquired by the drive current acquisition component 32. Furthermore, the position detector 33 calculates a determination threshold that is the produce of multiplying a specific determination coefficient by the average value found as above. The position detector 33 is configured so as to determine whether or not the latest drive current value has exceeded this determination threshold.

When the latest drive current value has exceeded the determination threshold, it can be concluded that the drive current has spiked. As can be seen in FIG. 5, this spiking of the drive current happens immediately after the start of drive of the steering mechanism 11 (when the starting current is flowing) and when the rudder 17 has reached the end of its movable range. However, since the position detector 33 in this embodiment starts calculating the determination threshold after the starting current has stabilized, it does not determine that the starting current has exceeded the determination threshold.

In view of this, the position detector 33 determines that the rudder 17 has reached the end of its movable range when the latest drive voltage value has exceeded the determination threshold. For this determination to be performed accurately, the determination coefficient needs to be properly set so that the drive voltage value will exceed the determination threshold only when the rudder 17 has reached the end of its movable range. That is, the above-mentioned determination coefficient is preferably a value of at least 1, and a value that can be distinguished from sensor noise or minute changes in drive current, and that allows a sudden increase in drive current when the rudder 17 has reached the end of its movable range to be reliably ascertained.

With the configuration of this embodiment given above, even though no dedicated sensor (rudder angle sensor) is provided for detecting the position of the rudder 17, the position detector 33 can still detect that the rudder 17 has reached the end of its movable range. Since the rudder 17 can be driven to the left and right, there is a left end and a right end to the movable range of the rudder 17. Therefore, the position detector 33 in this embodiment can detect that the rudder 17 has reached the right end of its movable range, as well as that the rudder 17 has reached the left end of its movable range.

With the automatic steering device 30 in this embodiment, the rudder turning speed acquisition component 23 is configured so as to calculate they rudder turning speed based on the detection result of the position detector 33. Specifically, the movable range of the rudder 17 is decided physically, so the amount of change in the rudder angle when the rudder 17 moves from one end of its movable range to the other is a known quantity. In view of this, the rudder turning speed acquisition component 23 measures how long it takes from the point when the position detector 33 has detected that the rudder 17 has reached one end of its movable range until the steering mechanism 11 is driven toward its opposite end and the position detector 33 detects that the rudder 17 has reached the other end of its movable range. The rudder turning speed acquisition component 23 calculates the amount of change in the rudder angle per unit of time (the rudder turning speed) by dividing the amount of change in the rudder angle by the measured time.

With the configuration in this embodiment, the rudder turning speed can be measured even though no dedicated sensor (rudder angle sensor) is provided for detecting the position of the rudder 17. In this case, since the rudder turning speed can be acquired even though the user does not visually confirm the movement of the rudder 17, measurement of the rudder turning speed imposes no burden on the user. Therefore, an operation test of the automatic steering device 30 can be carried out simply even though no rudder angle sensor is provided to the steering mechanism 11.

As described above, the automatic steering device 30 in this embodiment includes the drive current acquisition component 32 that acquires the drive current of the steering mechanism 11, and the position detector 33 that detects the position of the rudder 17 based on this drive current.

With this configuration, the position of the rudder 17 can be detected by monitoring the drive current of the steering mechanism 11 even though no special sensor is provided for detecting the position of the rudder 17.

Preferred embodiments and modification examples of the present invention are described above, but the above configurations can be modified as follows, for example.

The automatic steering device of the present invention can be used not only for the purpose of controlling the rudder of a boat or ship, but also for the purpose of controlling the tiller of another moving body, such as an airplane.

In the above embodiments, the steering mechanism 11 is configured to drive the rudder 17 with a hydraulic pump, but this is not the only option, and the configuration can be such that the rudder 17 is driven by a gear motor made up of mechanical gears, for example. Here again, the steering mechanism 11 can be controlled by the automatic steering device of the above embodiments by having a configuration in which the above-mentioned gear motor of the steering mechanism 11 can be controlled by PWM.

In the above embodiments, the steering mechanism 11 is controlled by PWM, so the rudder turning speed can be controlled by the duty ratio of the drive voltage. However, the configuration of the present invention is also effective when the rudder turning speed is controlled by a parameter other than duty ratio. For instance, the rudder turning speed can be controlled by using the level of the drive voltage as a parameter. In this case, the correspondence between the level of the drive voltage and the rudder turning speed is found based on the rudder turning speed while the drive voltage level is a first level and the rudder turning speed while the drive voltage level is a second level. Alternatively, the rudder turning speed can be controlled by using the level of the drive current as a parameter, for example. In this case, however, since the rudder turning speed and the drive current level are not limited to a simple proportional relation, it is expected to be difficult to find the correspondence between the current level and the rudder turning speed. If the configuration is such that the rudder turning speed is controlled by using the duty ratio as a parameter as in the above embodiments, the duty ratio and the rudder turning speed can be considered to have a simple proportional relation, so it will be simple to find the correspondence between duty ratio and rudder turning speed.

In the above embodiments, the first duty ratio is 100% and the second duty ratio is 50%, but this is not the only option, and any values can be used. However, if the duty ratio is too low, the steering mechanism cannot be adequately driven, and this can result in the relation between duty ratio and rudder turning speed not being considered to be a simple proportional relation. In view of this, the first duty ratio and the second duty ratio are preferably both high enough to adequately drive the steering mechanism (such as at least 50%).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An automatic steering device configured to control a steering mechanism for driving a rudder of a moving body based on a duty ratio of drive voltage applied to the steering mechanism corresponding to a rudder turning speed, the automatic steering device comprising:
    a controller programmed to find a correspondence between the rudder turning speed and a value of the duty ratio based on the rudder turning speed while the steering mechanism is controlled by setting the duty ratio to a first value and the rudder turning speed while the steering mechanism is controlled by setting the duty ratio to a second value; and
    the controller being further programmed to calculate the duty ratio to attain an optimal rudder turning speed at a cruising speed of the moving body based on the correspondence.

2. The automatic steering device according to claim 1, further comprising
    a drive current detector configured to detect a drive current of the steering mechanism, and
    a position detector configured to detect a position of the rudder based on the drive current.

3. The automatic steering device according to claim 2, wherein
    the position detector is further configured to detect that the rudder has reached an end of its movable range upon detecting a sudden increase in the drive current.

4. The automatic steering device according to claim 3, wherein
    the position detector is further configured to detect the position of the rudder based on the drive current after a starting current stabilizes.

5. The automatic steering device according to claim 3, wherein
    the controller is further programmed to calculate the rudder turning speed by measuring how long it takes for the rudder to move from one end of its movable range to the other end.

6. The automatic steering device according to claim 1, wherein
    the controller is further programmed to find the correspondence by considering that the duty ratio and the rudder turning speed are in a proportional relation.

7. The automatic steering device according to claim 1, further comprising
    an optimal rudder turning speed memory configured to store the optimal rudder turning speed at the cruising speed of the moving body.

8. The automatic steering device according to claim 1, wherein
    the controller is further programmed to acquire a running situation of the moving body, acquire an optimal rudder turning speed according to the running situation and calculate the duty ratio corresponding to the optimal rudder turning speed based on the correspondence.

9. An automatic steering method for controlling a steering mechanism for driving a rudder of a moving body based on a duty ratio of drive voltage applied to the steering mechanism corresponding to a rudder turning speed, the automatic steering method comprising:
    acquiring by a controller the rudder turning speed while the steering mechanism is controlled by setting the duty ratio to a first value as a first rudder turning speed;
    acquiring by the controller the rudder turning speed while the steering mechanism is controlled by setting the duty ratio to a second value as a second rudder turning speed;
    finding by the controller a correspondence between the rudder turning speed and a value of the duty ratio based on the first rudder turning speed and the second rudder turning speed; and
    calculating by the controller the duty ratio to attain an optimal rudder turning speed at a cruising speed of the moving body based on the correspondence between the rudder turning speed and a value of the duty ratio.

10. The automatic steering method according to claim 9, further comprising
    detecting a position of the rudder based on a drive current of the steering mechanism detected by a sensor.

11. The automatic steering method according to claim 10, wherein
    the detecting of the position of rudder includes a detection that the rudder has reached an end of its movable range upon detecting a sudden increase in the drive current.

12. The automatic steering method according to claim 10, wherein
    the detecting of the position of the rudder includes detecting the position of the rudder based on the drive current after a starting current stabilizes.

13. The automatic steering method according to claim 11, further comprising
    calculating the rudder turning speed by measuring how long it takes for the rudder to move from one end of its movable range to the other end.

14. The automatic steering method according to claim 9, wherein
    the finding of the correspondence includes finding the correspondence by considering that the duty ratio and the rudder turning speed are in a proportional relation.

15. The automatic steering method according to claim 9, further comprising
    storing the optimal rudder turning speed at the cruising speed of the moving body.

16. The automatic steering method according to claim 9, further comprising
    acquiring a running situation of the moving body, and
    acquiring an optimal rudder turning speed according to the running situation,
    the calculating of the duty ratio including calculating the duty ratio corresponding to the optimal rudder turning speed according to the running situation based on the correspondence between the rudder turning speed and a value of the duty ratio.

17. The automatic steering device according to claim 1, wherein
    the controller is further configured to control the steering mechanism to drive the rudder with the drive voltage at the duty ratio that attains the optimal rudder turning speed.

18. The automatic steering method according to claim 9, further comprising
    controlling the steering mechanism by the controller to drive the rudder with the drive voltage at the duty ratio that attains the optimal rudder turning speed.

* * * * *